Oct. 20, 1970 M. R. CANNON ET AL 3,535,622
MAGNETIC TAPE TESTER UTILIZING A DETECTOR HEAD, D.C. BIASED
TO OPPOSE THE TEST MAGNETIZATION ON THE TAPE
Filed Oct. 16, 1968 3 Sheets-Sheet 1

INVENTORS
MAXWELL R. CANNON
RODNEY OLDEN
KUNIOMI TAKAHASHI
BY Homer L. Knearl
AGENT United States Patent Office 3,535,622
Patented Oct. 20, 1970

3,535,622

MAGNETIC TAPE TESTER UTILIZING A DETECTOR HEAD, D.C. BIASED TO OPPOSE THE TEST MAGNETIZATION ON THE TAPE

Maxwell R. Cannon, Rodney Olden, and Kuniomi Takahashi, Boulder, Colo., assignors to International Business Machines Corporation, Armonk, N.Y., a corporation of New York Filed Oct. 16, 1968, Ser. No. 768,014
Int. Cl. G01r *33/12*
U.S. Cl. 324—34 9 Claims

ABSTRACT OF THE DISCLOSURE

This invention detects tape defects down to and in the order of $10^{-5}$ inches in diameter or depth. This detection is achieved by recording a saturating DC test signal on the tape and reading the tape with a magnetic head having a bias winding and a sense winding. The bias on the head supplied by the bias winding is in the opposite direction to the saturated signal recorded on the tape. The bias winding permits the read head to sense very small or very shallow defects whether they be holes or bumps. The output of the sense winding is amplified, integrated and then passed to a level detector for the purpose of detecting fluctuations in flux in the read head caused by defects in the tape. The integrator has a frequency response characteristic which is inverse to the characteristic of the read head. Accordingly, the overall effect from the read head through the integrating amplifier is to produce a detection system that has a flat-frequency response curve. The region of flat-frequency response is controlled by choice of components of the integrator.

BACKGROUND OF THE INVENTION

Prior tape testing has consisted of (1) recording a strong direct current signal which saturated the tape, or (2) recording an alternating current signal which saturated the tape, or (3) recording a high frequency AC signal so weak that it penetrates only to a shallow depth in the tape. Each of these recording techniques is useful in detection of specific types of defects in tape. However, none of the techniques in and of themselves successfully detect all types of defects in a tape.

In the case of a DC saturated tape, test circuitry attached to the read head looks for pulses picked up from the saturated tape by the read head. The read head generates the pulses when a fault in the tape causes a change of flux in the read head as the DC saturated tape moves under the read head. The short-coming of this test is that it has very low sensitivity to shallow holes in or bumps on the tape that are in the order of $10^{-5}$ inches.

In AC saturated tape testing, a test circuit, attached to the read head monitors the envelope of the AC signal from the saturated tape. This envelope of the AC signal will correspond in amplitude to the thickness of the oxide coating on the magnetic tape. In this way, large defects ($10^{-3}$ inches in diameter) in the tape cause the tape to be either much thicker or much thinner than normal. The envelope of the AC signal will fluctuate as the read head moves over a hole or a bump. This testing technique is inadequate since it does not detect shallow holes or bumps or deep holes of very narrow diameter.

In AC shallow recording tape testing, the test circuit attached to the read head looks to the amplitude of each half cycle of the AC signal to check if that amplitude is below a threshold level. The test circuit is complex in that it contains a sampling circuit for sampling the peak portion of the AC recorded signal and also a threshold circuit for detecting when the sampled portion exceeds a threshold. Synchronization must be maintained between the sampling circuit and the frequency of the signal read by the read head. Accordingly, the frequency of the recorded signal on the tape and speed of the tape must be accurately controlled. If the test circuit, the recording frequency, and the speed of the tape are all properly adjusted, AC shallow recording can detect very shallow defects in the surface of the tape. The shortcoming of AC shallow testing is that it will not pick up small diameter defects (in the order of $10^{-5}$ inches) no matter how deep they may be in the tape. Also, the complexity of the circuits and adjustment of the equipment means the technique is very costly and difficult to work with.

At present, complete testing of the tape requires that the tape be run through a combination of the above-mentioned tests so as to detect all defects. The typical combination is to use DC saturation to detect all deep hole defects in the tape, and AC shallow tape testing for detecting most shallow defects. This combination will still not detect shallow defects of very small diameter. Furthermore, a great deal of hardware is involved in that two tests must be performed and the AC shallow test particularly requires a great amount of hardware.

It is an object of this invention to test for all defects including those in the order of $10^{-5}$ inches in depth or diameter.

It is a further object of this invention to test for all small and shallow defects in a tape by use of single tape testing technique.

It is a further object of this invention to test for all defects, shallow or small in size in a tape, by use of a tape testing read head having a bias flux therein opposite in direction to the recorded signal on the tape.

SUMMARY OF THE INVENTION

In accordance with this invention the above objects are accomplished by DC erasing the tape with an erase head, and sensing tape defects with a read head wherein the flux in the read head has a component due to magnetization of the tape and a bias component provided by a bias winding on the read head. Furthermore, the bias flux in the read head is in the opposite direction to the flux in the read head caused by magnetization of the tape. The addition of the bias flux in the read head greatly enhances the ability of the read head sense winding to detect small or shallow defects in the tape. In effffect, the bias in the read head causes the flux in the read head to shift to a point on the hysteresis loop of the tape as seen by the read head where the read head is more sensitive to defects in the tape.

The advantages of our invention over the prior tape testers are several fold. First, our tape test will detect all defects, large, small, shallow, or deep, and, therefore, it is not necessary to use a multiplicity of tests, as in the past. Second, our tester is much simpler in construction and operation than prior testers. For this reason, the cost of constructing and maintaining our tester is much lower. Third, the addition of a variable bias to the read head permits adjustment of a head to a condition where its sensitivity to both holes and bumps is optimum. Altogether, our tape tester gives more acurate information about the surface of the tape, costs less, and is easier to operate than prior testers.

The foregoing and other objects, features and advantages of the invention will be apparent from the following more particular description of a preferred embodiment of the invention, as illustrated in the accompanying drawings.

DESCRIPTION

Figure 1:
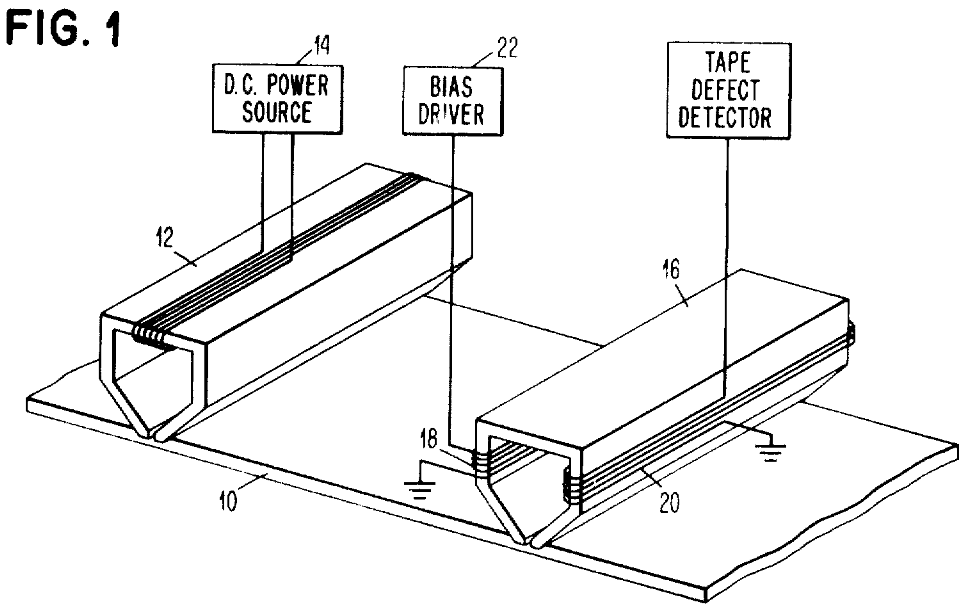
FIG. 1 shows a strip of magnetic tape being recorded and tested with wide-track magnetic heads wherein the read head has both a bias winding and a sense winding.

Referring now to FIG. 1, one embodiment of the invention is shown in block-diagram form. Magnetic tape 10 with a magnetic oxide coating on a substrate is moved past two magnetic heads. The tape is under tension supplied by vacuum columns in the well-known manner. This tension causes the tape to be in contact with the magnetic heads.

Magnetic head 12 is the erase head. It is driven by a DC power source 14. The power source 14 drives the head 12 sufficiently hard to saturate the oxide layer of the magnetic tape 10. The effect is to erase all previous signals on the magnetic tape and place a DC saturated magnetization in the tape 10.

Magnetic head 16 is the read head and has two windings thereon. Winding 18 is the bias winding, while winding 20 is the sense winding. Bias winding 18 is driven by the bias driver 22. Bias driver 22 is a DC power supply which drives current through the bias winding 18 in a direction to produce a flux in the head 16 which is opposite in direction to flux picked up from the tape 10. The flux of tape 10 is of a given direction because DC erase head 12 records a DC signal on the tape in a given direction. Sense winding 20 has one end grounded and the other end connected to a tape defect detector.

Figure 2:
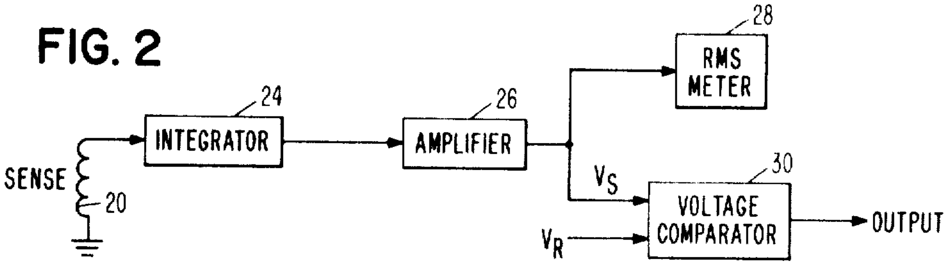
FIG. 2 is a block diagram of the tape defect detector of FIG. 1.

The tape defect detector is shown in block-diagram form in FIG. 2 and comprises an intergrator 24 followed by an amplifier 26 and two defect monitoring devices. One device is simply an RMS volt meter 28. This RMS volt meter gives an average reading as the tape moves under the sense head and is a measure of the surface roughness of the tape.

To detect specific defects in the tape, the signal from amplifier 26 is passed to the voltage comparator 30. The signal $V_S$ from amplifier 26 is compared with a reference level $V_R$ by the voltage comparator 30. When the signal voltage exceeds the reference voltage, voltage comparator 30 has an output.

Figures 3A, 3B:
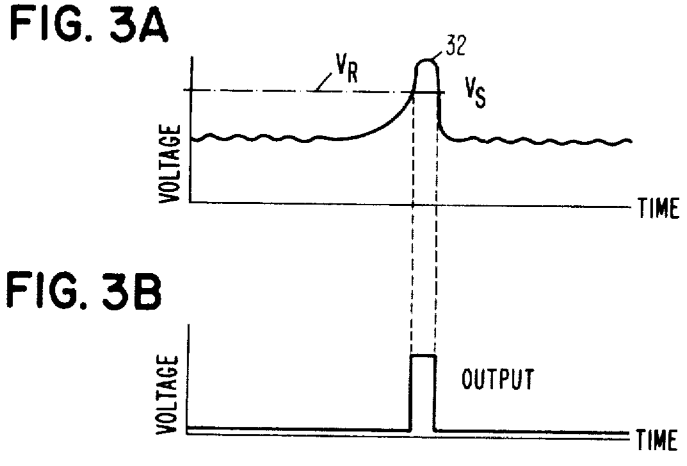
FIGS. 3A and 3B show example wave forms that may appear in the tape defect detector of FIG. 2.

The functional operation of the voltage comparator 30 is shown by the waveforms in FIGS. 3A and 3B. In FIG. 3A the voltages applied to the voltage comparator are shown. In FIG. 3B, which has the same time relationship as FIG. 3A, the output of the voltage comparator 30 is shown. As is evident, when the signal voltage $V_S$ has a spike 32 which exceeds the reference voltage, $V_R$, the output voltage of comparator 30 changes from a low level to a high level.

Referring again to FIG. 2, integrator 24 is built to have a frequency response inverse to the frequency response of the read head 20. Over the frequency range, where the frequency response of the read head and integrator are inverse, the output from the integrator is an amplified signal directly proportional to the flux in the sense head. In other words over a predetermined frequency range the read head 20 and the integrator 24 have a flat-frequency response and produce a signal out of the integrator which varies directly with the flux in the sense winding 20. Amplifier 26 operates to further increase the signal from the integrator 24 and also to match impedances in coupling the signal from the integrator to the RMS meter 28 and to the voltage comparator 30.

Figure 4:
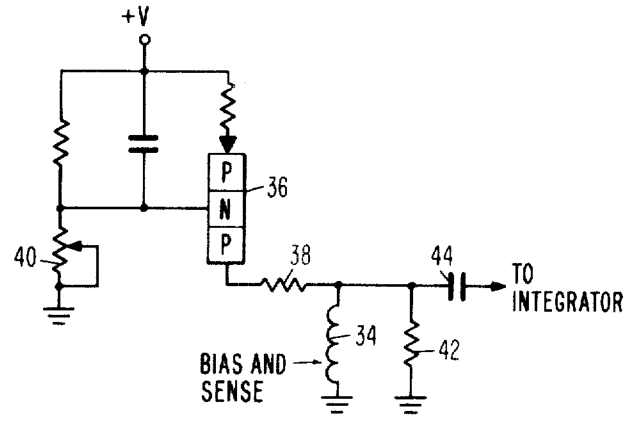
FIG. 4 is a schematic diagram of an alternative embodiment of the invention wherein the bias winding and the sense winding on the read head are one and the same winding, and the bias functions and sense functions are electrically separated.

Now referring to FIG. 4, an alternative configuration for the invention is shown wherein the bias and sense winding are one and the same. Winding 34 in FIG. 4 is the common winding and would be a single winding on a read head. The bias for the read head is supplied to the winding 34 by the transistor 36. The transistor 36 supplies a controlled amount of current through resistor 38 and winding 34. Since the current supplied by transistor 36 is a DC current, the winding 34 appears as a short circuit. The amount of current supplied to the winding 34 by the transistor 36 is controlled by adjustment of variable resistor 40. Resistor 40 is adjusted to change the current supplied to the emitter junction of transistor 36, and thereby, control the current through the transistor 36 and thus through the winding 34.

As a sense winding, winding 34 picks up changes of flux and generates a voltage signal across resistor 42 which is passed by capacitor 44 to the integrator shown in FIG. 2. Capacitor 44 isolates the DC current provided by transistor 36 so that it flows only into the winding 34, and not into the integrator 24. Once the integrator receives the signal from the winding 34, the defect detection operates in the same manner previously described with reference to FIG. 2.

OPERATION

Figure 5:
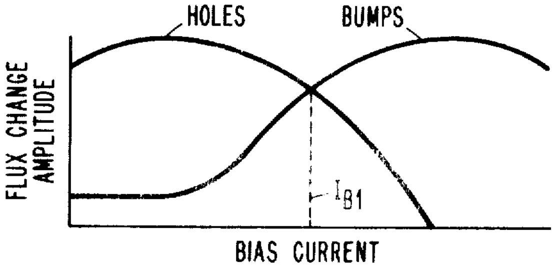
FIG. 5 shows a graph of the sensitivity of the read head for holes and bumps as a function of the bias flux in the read head.

In FIG. 5 the flux-change amplitude of a tape defect picked up by the read head 16 (FIG. 1) is displayed in a graph as a function of the bias current supplied to the bias winding 18 (FIG. 1). The flux-change amplitude is a measure of a tape defect detector system's ability to indicate the presence of a defect. As shown in FIG. 5, the amplitude as a function of bias is plotted both for holes in the tape and bumps on the tape. Where each function is at a maximum, the other function is near zero. Since these two functions do not peak at the same bias level, it is desirable to adjust the bias to a point where there is optimum sensitivity for both holes and bumps. As shown in FIG. 5, this would be at a bias current level $I_{B1}$. Of course, if only holes or only bumps are to be detected, the bias may be adjusted so that the read head has high sensitivity to one type of defect and low sensitivity to the other type of defect.

The functions plotted in FIG. 5 are representative and no values for points on the functions are given because the functions, though they maintain the same basic shape, may be of various heights and widths, dependent upon such things as the gap in the read head and the gain of the integrator 24 and the amplifier 26. The two functions may be better understood by examining graphs indicating magnetic flux or field in the read head.

Figure 6A:
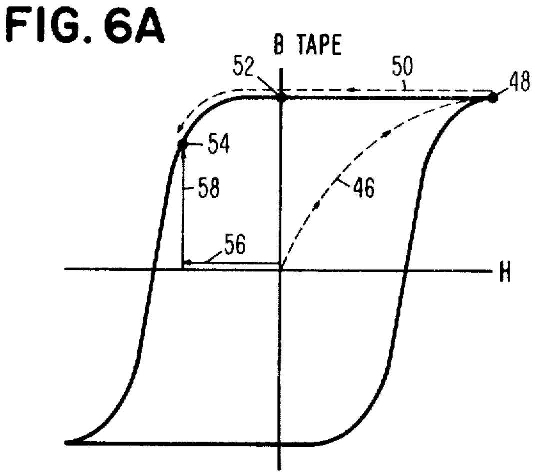
FIGS. 6A and 6B indicate the strength of the magnetic fields in the tape and the read head where the read head is looking for a hole in the tape.
Figure 6B:
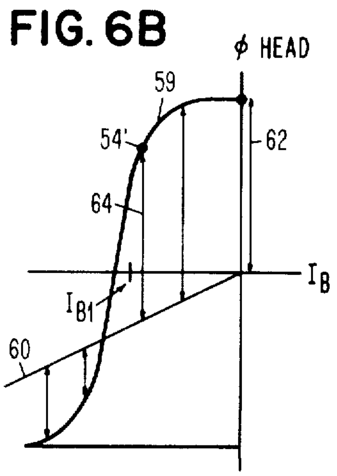

The amplitude function for detection of holes, as shown in FIG. 5, may be understood by examining FIGS. 6A and 6B. In FIG. 6A the hysteresis loop for the magnetic tape is shown. The loop represents a composite average through the thickness of the tape at a particular position on the tape. Assume initially that the tape has no magnetization; then as erase head 12 (FIG. 1) saturates the tape, the magnetization of the tape moves along line 46 to point 48. As the tape leaves the erase head 16, the H field through the tape decreases to zero and the magnetization of the tape moves align line 50 to a point 52.

When the same portion of the tape reaches the read head 16 (FIG. 1), the H field produced by the bias winding 18 (FIG. 1) causes the tape to be demagnetized so that under the read head 16 the magnetization of the tape moves to point 54. The length of the arrow 56 along H axis indicates the average strength of the magnetic field as produced by the bias winding on the read head at an average distance into the thickness of the tape. The length of the arrow 58 indicates the average strength of the magnetization or magnetic field in the tape when the tape is under the read head.

Referring now to FIG. 6B the flux in the read head is the vertical axis, and the current in the bias winding is the horizontal axis. Curve 59 is the magnetic flux in the head as a function of bias current $I_B$ when the tape is under the head. Curve 59 has the same shape as the left-hand half of the hysteresis loop in FIG. 6A. Curve 59 has the same shape because the flux in the head is the same as the flux in the tape reduced by a constant amount. The reduction is due to the distance between the tape and the head. When detecting holes, this distance is constant so that reduction factor is constant.

Also plotted and superimposed on FIG. 6B is the flux that would have been produced in the read head by the bias winding if the magnetic tape had not been present. This is indicated by the line 60. In other words, with no tape present, flux in the read head is approximately a linear function of the current in bias winding $I_B$.

In FIG. 6B, the vertical difference between curve 59 and line 60 is the maximum flux change amplitude to be expected when there is a hole or depression in the magnetic oxide layer of tape. For example for a current $I_B$ equal to zero the length of the arrow 62 indicates the maximum amplitude of flux change to be expected during the detection of a hole by a sense winding 20 on the reading head 16 (FIG. 1). Where the current in the bias winding $I_B$ is such as to demagnetize the tape to point 54 (FIG. 6A) then arrow 64 at point 54' indicates the maximum amplitude of flux change to be expected during the detection of defects by the read head.

From the two functions plotted in FIG. 6B, it is clear that the amplitude of flux change increases slightly as the bias current is increased and then decreases to zero and switches in polarity before it begins to increase again. This variation in amplitude of flux change versus current in the bias winding corresponds to the amplitude function versus bias current for holes as graphed in FIG. 5.

The amplitude of flux changes as a function of bias current for the detection of bumps is a more complex function to understand because the separation of the tape from the read head as produced by the bump is a factor in producing the flux change. To understand the variations of flux amplitude as a function of bias current, reference is now made to FIG. 7, 8A and 8B.

Figure 7:
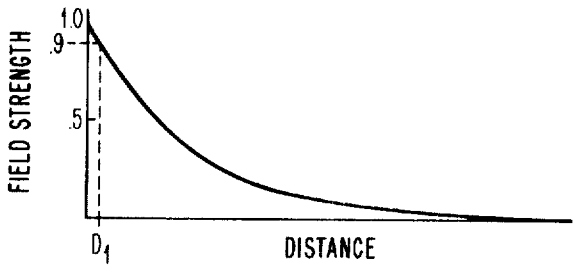
FIG. 7 shows the decrease in field strength as a function of distance from the source of the field.

In FIG. 7 the well-known function of field strength as a function of distance from the source is plotted. This graph is an exponential curve and merely indicates that as the tape moves away or is separated from the read head, the field in the tape decreases exponentially.

When a tape with a bump on its surface passes over a read head or a write head, the bump makes contact with the head and pushes the tape away from the head. This increased the separation of the tape from the head tends to reduce the amount of field reaching the tape from the head and vice versa. However, as the tape moves past the erase head, the bump has no effect since the erase head is generating a very strong field which causes the field to saturate whether or not it is pushed away from the head. On the other hand, the field of the tape at the read head 16 (FIG. 1) is affected by the separation since the bias winding is not producing a field strong enough to saturate the tape.

Figure 8A:
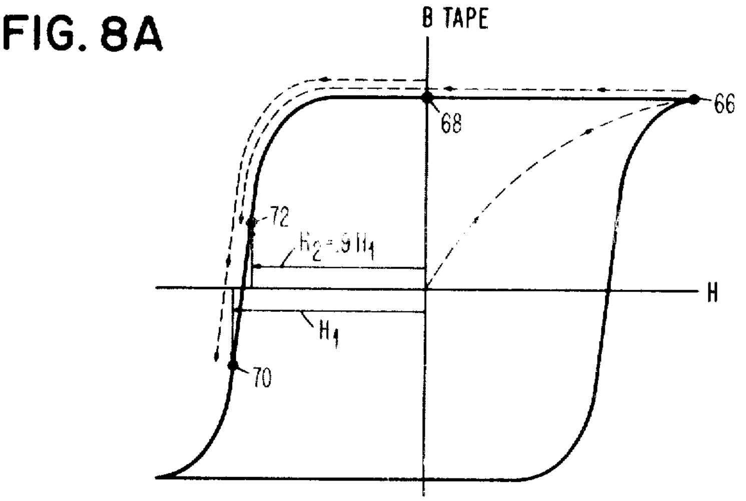
FIGS. 8A and 8B indicate the strength of the magnetic fields in the tape and the read head when the read head is looking for bumps on the tape.

In FIG. 8A the effect of the bias of read head on the tape is shown. As previously described with reference to FIG. 6A, the erase head drives the magnetic tape into saturation at point 66, and then as the tape leaves the erase head it remains in saturation and moves to point 68. If there is no bump on the tape, it is assumed that the bias field and the read head is strong enough to produce the $H_1$ vector which in turn causes the tape to be demagnitized from point 68 down to point 70.

On the other hand, if there is a bump on the tape, then where the bump is attached the tape is slightly pushed away from the read head. Referring again to FIG. 7, if the tape is pushed away to a distance $D_1$, this causes the field strength in the tape to be reduced from a factor 1 to a factor of 1 to a factor of 9/10's. In FIG. 8A the vector $H_2$ is equal to 9/10's of vector $H_1$, $H_2$ will then cause the tape to be demagnetized from point 68 to point 72.

In summary, where the tape has no bump and where the bias field is such as to produce a field $H_1$, the tape is demagnetized to point 70. For the same bias in the read head, if a bump cause a $D_1$ separation between tape and head, the portion of the tape attached to the bump is demagnetized only to point 72. The bias in the read head must be such as to demagnetize the tape into the area of the steep slope of hysteresis loop in FIG. 8A. If the bias is such that it does not demagnetize the tape out of saturation, the addition of bias to the read head 16 (FIG. 1) will not enhance the detection of bumps.

The separation of the tape from the magnetic head, as caused by the bump on the tape, is also a factor in the amount of flux in the read head. To indicate the effect, reference is now made to FIG. 8B where the flux in the head is graphed as a function of the current in the bias winding $I_B$. Only negative bias current $I_B$ is used because negative current generates a flux or field in the tape opposite in direction to the saturation or erase field produced by the erase head.

Figure 8B:
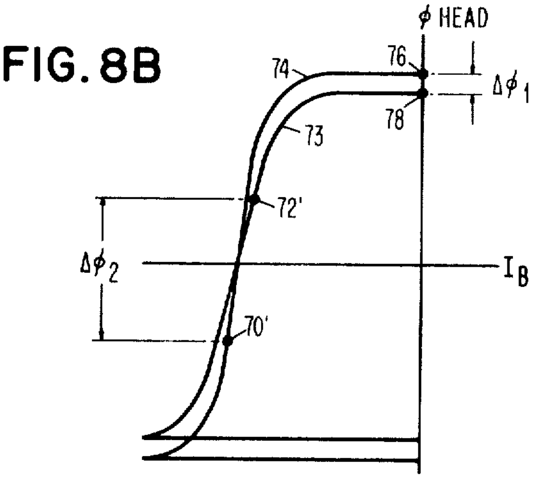

In the same manner as discussed previously with reference to FIG. 6A and 6B, the function indicating the flux in the head in FIG. 8B has the same shape as the function indicating the magnetic field in the tape in FIG. 8A. However, contrary to the examples in FIGS. 6A and 6B, the separation between head and tape is not constant; therefore, two graphs are shown in FIG. 8B indicating the extremes, One extreme is where the tape has no bump and is in contact with the read head. The other extreme is where the tape has a bump and this bump causes the tape to be separated a distance $D_1$ from the read head.

As pointed out in FIG. 7, this distance $D_1$ will cause a reduction of 9/10's in the amount of field which reaches the read head from the magnetic tape. Therefore, for this example of $D_1$ separation produced by a bump, the flux in the head for function 74 in FIG. 8B must be reduced by a factor of 9/10's to arrive at a function 72 in FIG. 8B where function 74 represents the situation of no bump on the tape and function 72 represents the situation of a bump on the tape. In FIG. 8A, where there is no bump on the tape the tape is demagnetized to point 70. This produces a corresponding point 70' on the equivalent curve 74 for flux in the head where there is no bump. When there is a bump, FIG. 8A indicates that the tape is only demagnetized to point 72. In FIG. 8B point 72' corresponds to the same point 72 in FIG. 8A. However, in FIG. 8B, the curve at 73 is reduced in amplitude relative to curve 74 because the bump on the tape causes the tape to move away from the head.

The significant fact evident from FIG. 8B is that the change in flux in the head where there is a bias current can be much larger than the change in flux in the head when there is no bias current. If the bias current is zero and therefore the bias winding has zero flux, the change in flux in the head is indicated by the difference between points 76 and 78. Whereas, if the bias winding produces a field in the tape that moves the demagnetization of the tape over to the steep slope, as shown in FIGS. 8A and 8B, the change in flux can be the difference between points 70' and 72' in FIG. 8B. It is evident that by biasing the tape to the steep part of the hysteresis loop the detection of bumps is greatly enhanced.

The amplitude of the flux change plotted against bias for detection of bumps is shown in FIG. 5, as previously discussed. Comparing FIG. 5 with FIGS. 8A and 8B, it is clear why the amplitude of the flux change is very low for bias current equal to zero and increases to a maximum where the bias current causes magnetization in the tape on the step part of the hysteresis loop. As the bias current increases gradually from zero, there is little or no increase in the flux change amplitude. When the bias current reaches a point where the tape is being demagnetized on the vertical slope of the hysteresis curve the difference between demagnetization of tape without a bump and tape with a bump begins to increase rapidly.

The separation from the read head which causes this change in amount of demagnetization for the two cases also causes a slight reduction in the amount of changes detected by the head. This reduction is due to the fact the field back from the tape, as seen by the head, is also reduced because of separation. However, the much greater effect of a change in demagnetization because of the steep slope of the hysteresis curve causes a rapid increase in the flux change amplitude as a bump passes over the read head.

As is evident from FIG. 5, it is possible to djust the bias current and thus the bias field so an optimum point for detecting both holes and bumps is arrived at. This optimum point identified as $I_{B1}$ is a bias that will cause the tape to be demagnetized to a point on the steep point of the hysteresis loop, while at the same time will not cause the flux in the head due to tape and bias to be equal to the flux in the head when only a bias is present. This may be more clearly seen in FIG. 6B where a tentative point for $I_{B1}$ is shown. If $I_{B1}$ is of this value, then the flux in the head for the detection of holes, as shown in FIG. 6B, must still have significant amplitude, and at the same time, for the detection of bumps the demagnetization of the tape will be on the steep part of the hysteresis loop.

It will be appreciated by one skilled in the art that there may be various hardware changes in the detection circuitry; however, the essence of the invention lies in the increasing of the size of pulses fed the detection circuitry by use of a bias field in the read head, as discussed above. That bias field, as pointed out, may be generated by a bias winding separate from a sense winding on the read head or a single winding may be used in the bias driver and sense detection may be electronically separated by the filter. Furthermore, the hardware shown has been single-sided hardware with one side grounded. One could use differential hardware center-tap-to-ground in the well-known manner.

As previously pointed out, this hardware and testing technique permits the detection of very shallow or very small defects in magnetic tape down to and in the order of $10^{-5}$ inches in diameter or depth. This limitation is imposed by the present state of the magnetic recording art and is not a limitation on the principles of the invention. In other words this testing technique can only detect errors down to $10^{-5}$ inches simply because (1) the best contact to date between tape and tape heads is in the order of $10^{-5}$ inches of separation, and (2) the frequency response of heads limited by their structure (specifically the gap length) does not have a broad enough range to pick up enough energy when very small defects pass over the tape head. Therefore, in the future if the state of the art develops tape heads of smaller gap length and improves tape contact, the inventive testing technique herein will also be able to detect defects smaller than $10^{-5}$ inches in diameter or depth.

While the invention has been particularly shown and described with reference to preferred embodiments thereof, it will be understood by those skilled in the art that various changes in form and details may be made therein without departing from the spirit and scope of the invention.

What is claimed is:

1. Apparatus for detecting defects in a flexible magnetic storage medium comprising:
- means for saturating the medium with a DC magnetic field of a predetermined direction;

- a magnetic transducing means for scanning the medium;
- means for biasing said transducing means with a bias magnetic field opposite in direction to the magntization of the medium provided by said saturating means whereby the magnetization of the medium is driven to a point of steep slope on the medium's B–H curve as the magnetic field of said transducing means interacts with the medium;
- means for sensing a change in the magnetic field in said transducing means; the magnetic field in said transducing means being a function of the effect the bias magnetic field has on the magnetization of the medium under said transducing means.

2. The detecting apparatus of claim 1 wherein said biasing means is adjustable so that the sensitivity of the detecting apparatus may be varied to be selective as to the type of defects detected.

3. In magnetic tape testing apparatus having an erase head, a read head and tape driving means to move the tape past the erase head and then the read head, apparatus for testing for defects in magnetic tape comprising:
- means for energizing the erase head with a DC signal strong enough for the erase head to saturate the tape with a magnetic field of a predetermined direction;
- means for biasing the read head with a bias magnetic field opposite in direction to the magnetization of the tape provided by said erase means whereby the tape magnetization under the read head is driven to a point on the steep part of the tape hysteresis loop when the tape is under the read head so that a defective area in the tape produces a significant change in magnetic flux in the read head as the defective area moves past the read head;
- means for sensing a change in the magnetic field in the read head; the magnetic field in the read head being a function of the effect the bias magnetic field has on the magnetization of the tape under the read head as the tape moves past the read head.

4. The apparatus of claim 3 wherein said biasing means is adjustable so that the sensitivity of the testing apparatus may be varied to be more sensitive to holes than bumps, or more sensitive to bumps than holes, or equally sensitive to both holes and bumps on the tape.

5. The apparatus of claim 3 used for testing for holes in tape wherein said biasing means biases the read head with a magnetic field such that the tape under the read head is demagnetized to a corner of decreasing magnetization on tape hysteresis loop where the difference between magnetic field in the read head for normal tape, and the magnetic field in the read head for a hole in the tape is a maximum.

6. The apparatus of claim 3 for testing for bumps on the tape wherein said biasing means biases the read head with a magnetic field such that the tape under the read head is demagnetized to the point of steepest slope on the hysteresis loop where the difference between magnetic fild in the read head for normal tape and the magnetic field in the read head for a bump on the tape is a maximum.

7. A method for testing a flexible magnetic storage medium for defects comprising the steps of:
- saturating the medium with a DC magnetic field of a predetermined direction so that the medium is magnetized in the predetermined direction;
- scanning the medium for defects;
- biasing the medium in the area of the medium currently being scanned with a bias magnetic field opposite in direction to the magnetization acquired by the medium during saturation whereby the magnetization of the medium is driven to a point of steep slope on the medium's B–H curve;
- sensing a change in the magnetic field from the medium as the medium is scanned; the magnetic field from the medium being a function of the effect the bias magnetic field has on the magnetization of the medium.

8. The method of claim 7 for testing for bumps on the medium wherein said biasing step biases the medium with a bits magnetic field such that the area the medium being scanned is demagnetized to the point of steepest slope on the medium's B–H curve.

9. The method of claim 7 for testing for holes when the medium has nearly rectangular hysteresis loop wherein said biasing step bias the medium with a bias magnetic field such that the area of the medium being scanned is demagnetized to a corner of decreasing magnetization on the hysteresis loop.

References Cited

UNITED STATES PATENTS 2,937,368 5/1960 Newby ----------- 340—174.1

RUDOLPH V. ROLINEC, Primary Examiner

R. J. CORCORAN, Assistant Examiner

U.S. Cl. X.R.

179—100.2